(12) United States Patent
Peng et al.

(10) Patent No.: US 10,176,682 B1
(45) Date of Patent: Jan. 8, 2019

(54) CONSTANT INFRARED DETECTION FOR SECURITY

(71) Applicants: Jun Peng, Edinburg, TX (US); Ying Zhao, Edinburg, TX (US)

(72) Inventors: Jun Peng, Edinburg, TX (US); Ying Zhao, Edinburg, TX (US)

( * ) Notice: Subject to any disclaimer, the term of this patent is extended or adjusted under 35 U.S.C. 154(b) by 0 days.

(21) Appl. No.: 15/810,114

(22) Filed: Nov. 12, 2017

(51) Int. Cl.
| G08B 13/24 | (2006.01) |
| G08B 13/191 | (2006.01) |
| G08B 19/00 | (2006.01) |
| G01J 5/00 | (2006.01) |
| G08B 13/193 | (2006.01) |

(52) U.S. Cl.
CPC .......... G08B 13/191 (2013.01); G01J 5/0025 (2013.01); G08B 13/193 (2013.01); G08B 19/00 (2013.01)

(58) Field of Classification Search
CPC ...... G01J 5/08; G01J 5/0809; G02B 26/0841; G08B 13/193; G08B 29/046; G08B 13/191; G08B 29/18
USPC ... 340/565, 545.1, 545.8, 572.2, 573.1, 567, 340/539.1, 521, 531, 539.26, 541, 545.6
See application file for complete search history.

(56) References Cited

U.S. PATENT DOCUMENTS

| 4,963,749 A | 10/1990 | McMaster | |
| 6,348,863 B1 * | 2/2002 | Krubiner | G08B 13/191 250/342 |
| 6,774,791 B2 * | 8/2004 | Krubiner | G08B 13/191 250/342 |
| 7,916,018 B2 * | 3/2011 | Eskildsen | G08B 13/08 340/506 |
| 2006/0038679 A1 * | 2/2006 | Eskildsen | G01J 5/08 340/567 |
| 2007/0187605 A1 * | 8/2007 | Micko | G01J 1/46 250/339.04 |
| 2012/0307066 A1 * | 12/2012 | De Ieso | G08B 13/19602 348/152 |
| 2017/0147885 A1 * | 5/2017 | Aggarwal | G06K 9/00778 |

* cited by examiner

*Primary Examiner* — Daniel Previl

(57) ABSTRACT

A system and method for securing an edge zone in a space, while not restricting normal activities in the space, is provided. The system and method comprises an infrared detection device and a data processing means. The infrared detection device monitors a space using two or more fields of view. Some of the fields of view cover an edge zone of the space, while the rest of the fields of view cover an adjacent zone to the edge zone. The infrared detection device produces a signal when one or more infrared sources, such as human beings, enter one of its fields of view, in which the signal is unique for identifying the field of view being entered. The data processing means processes the signals from the infrared detection device for securing the edge zone with either intrusion detection or escape detection. The data processing means produces an alarm signal when an intrusion or escape is detected, but does not produce such a signal for normal activities in the monitored space, including the edge zone.

11 Claims, 5 Drawing Sheets

CONSTANT INFRARED DETECTION FOR SECURITY

FIELD OF THE INVENTION

The disclosed system and method generally relates to using infrared detection for security.

BACKGROUND OF THE INVENTION

Home and building break-ins cause big property loss almost every day. Moreover, when an intruder has a surprise encounter with an occupant in a house or building, the intruder or the occupant may act impulsively causing injuries or even deaths. Typical existing security systems rely on contact sensors, glass breakage sensors, vibration sensors, and motion sensors for detecting an intrusion.

A contact sensor works only when the window or door that it monitors is opened by the intruder, while an intruder may just break or even cut the glass on the window or door for an entrance. A glass breakage sensor or a vibration sensor is designed for detecting such an intrusion.

However, false alarms and false negatives are common complaints for glass breakage sensors and vibration sensors. Daily activities and bad weather may trigger such sensors. For example, clashing of dishes may trigger a glass breakage sensor, opening or closing a window or door may trigger a vibration sensor, and a thunder may trigger a vibration sensor too. The common method to deal with false alarms for such types of sensors is to lower their sensitivity, but lowered sensitivity results in those sensors not responsive to delicate intrusions in which intruders skillfully breaks or cuts the window or door.

The last defense in a typical existing security system is motion sensors, which are usually infrared detection sensors. When the other sensors fail to detect an intrusion, the intruder is expected to be detected by the motion sensors installed in the house or building. However, to avoid false alarms on an occupant, the motion sensors are bypassed when there are occupants in a house or building. Therefore, when an occupant is in a house or building, especially when the occupant is not vigilant, such as in sleep, in shower, playing video games, or watching TV, an intruder can circumvent an existing security system and put the occupant in great danger.

U.S. Pat. No. 7,916,018 B2, issued to Eskildsen et al. on Mar. 29, 2011, discloses a system using a motion sensor to detect whether a contact sensor at a window or door is triggered by an occupant opening the window or door, but the system cannot detect an intruder who either enters through an opened window or door or breaks a window or door for an entrance. U.S. Pat. No. 4,963,749, issued to McMaster on Oct. 16, 1990, describes systems doing one-direction infrared detection, but an occupant still triggers the systems when the occupant moves in the direction of intended detection. U.S. Pat. No. 6,348,863 B1, issued to Krubiner et al. on Feb. 19, 2002, claims systems detecting the direction of a movement for identifying an intrusion through a window or door. However, the timing complexity in the systems introduces detection delay and unreliability.

SUMMARY OF THE INVENTION

The disclosed system and method comprises an infrared detection device and a data processing means. The data processing means receives and processes the signals from the infrared detection device. The infrared detection device has two or more fields of view monitoring a space. Some of the fields of view cover an edge zone of the space, while the rest of the fields of view cover an adjacent zone to the edge zone. When one or more infrared sources, such as human beings, enter one of the fields of view of the infrared detection device, the infrared detection device produces a signal that is unique for identifying the field of view being entered. The data processing means processes the signals from the infrared detection device for securing the edge zone, while the system does not restrict normal activities in the monitored space, including the edge zone.

In some embodiments, the system and method determines whether an intrusion happens in the edge zone, such as at a window, door, or opening in the edge zone, or it is some normal activity in the monitored space, such as an occupant operating a window or its curtain in the space. In some other embodiments, the system and method determines whether an escape happens in the edge zone, such as at a window, door, or opening in the edge zone, or it is some normal activity in the monitored space, such as a guard patrolling the monitored space.

When the system and method detects an intrusion or escape, the system and method produces an alarm signal. The alarm signal can be an input to various security circuits or systems which generate alarms, take defense actions, or do both. The alarms may include sound, light, voice, and telecommunications, while the defense actions may include locking doors, releasing defense materials, and any other active defense action.

BRIEF DESCRIPTION OF THE DRAWINGS

The included drawings illustrate some embodiments of the disclosed system and method. In the embodiments, the disclosed system and method monitors a window for either intrusion detection or escape detection.

DETAILED DESCRIPTION OF EMBODIMENTS

Figure 1:
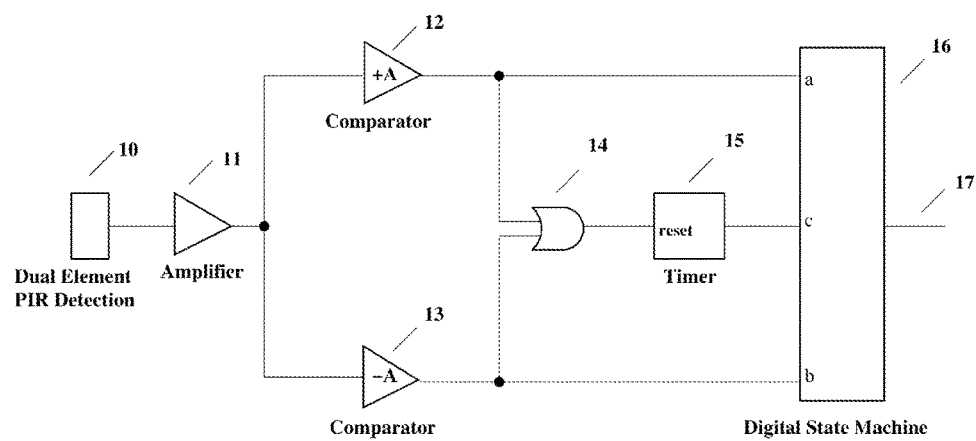
FIG. 1 shows a block diagram of the system and method.

In one embodiment, the disclosed system and method monitors a window for intrusion detection. FIG. 1 shows a block diagram of the system and method. As shown in FIG. 1, an infrared detection device 10 feeds its output to an amplifier 11. The output of the amplifier 11 is connected to two comparators, 12 and 13. The outputs of the comparators 12 and 13 are fed to an OR gate 14 and a digital state machine 16. The output of the OR gate 14 is connected to the reset input of a timer 15. The output of the timer 15 is fed to the digital state machine 16. Finally, the digital state machine has an output 17.

In this embodiment, the passive infrared (PIR) detection device 10 monitors a space using two fields of view provided by two infrared sensing elements such as two pyroelectric elements. When an infrared source, such as a human being, enters the field of view (FOV) of one element, the device 10 produces a positive signal. When an infrared source enters the FOV of the other element, the device 10 produces a negative signal. Therefore, the polarity of the produced signal identifies the FOV being entered. Most dual-element PIR detection devices work as described here.

The output of the device 10 is amplified by the amplifier 11, and then fed to the comparators 12 and 13. For threshold level detection, each comparator compares its input to a predetermined voltage amplitude of a particular polarity. When its input is of the particular polarity and over the predetermined voltage amplitude, the comparator produces a logic 1. Otherwise, the comparator maintains a logic 0 at its output. The comparator 12 uses a predetermined voltage amplitude of a positive polarity, while the comparator 13 uses a predetermined voltage amplitude of a negative polarity. The comparators 12 and 13 do not produce a logic 1 at the same time, since the comparators 12 and 13 share the same input signal from the device 10.

The outputs from the comparators 12 and 13 are fed to the OR gate 14 and also to the digital state machine 16. The output of the OR gate 14 is fed to the reset input of the timer 15. Each time the timer 15 is reset, it will expire after a predetermined amount of time. When the timer 15 expires, it produces a logic 1 at its output. Otherwise, the timer 15 maintains a logic 0 at its output. Whenever the reset input of the timer 15 receives a logic 1, the timer 15 is reset. Therefore, the timer 15 is reset whenever the comparator 12 or the comparator 13 produces a logic 1.

The digital state machine 16 receives the outputs from the comparators 12 and 13 and the timer 15. Just for convenience, these three inputs to the digital state machine 16 are denoted as "a", "b", and "c", respectively, as shown in FIG. 1. The output of the digital state machine 16 is fed to one or more security circuits or systems (not shown in FIG. 1) through the link 17. The details of the digital state machine 16 will be described later.

Although the links between components and systems in FIG. 1 are shown as wired links, it is not intended to be so limited. Any link in FIG. 1, or in any embodiment of the disclosed system and method, can be wired or wireless. When an application of the disclosed system and method demands, transceivers can be added to replace a wired link with a wireless link, such as a radio link. For example, the link 17 in FIG. 1 can be a radio link to other security circuits and systems (not shown in FIG. 1) generating alarms or taking defense actions.

Figure 2:
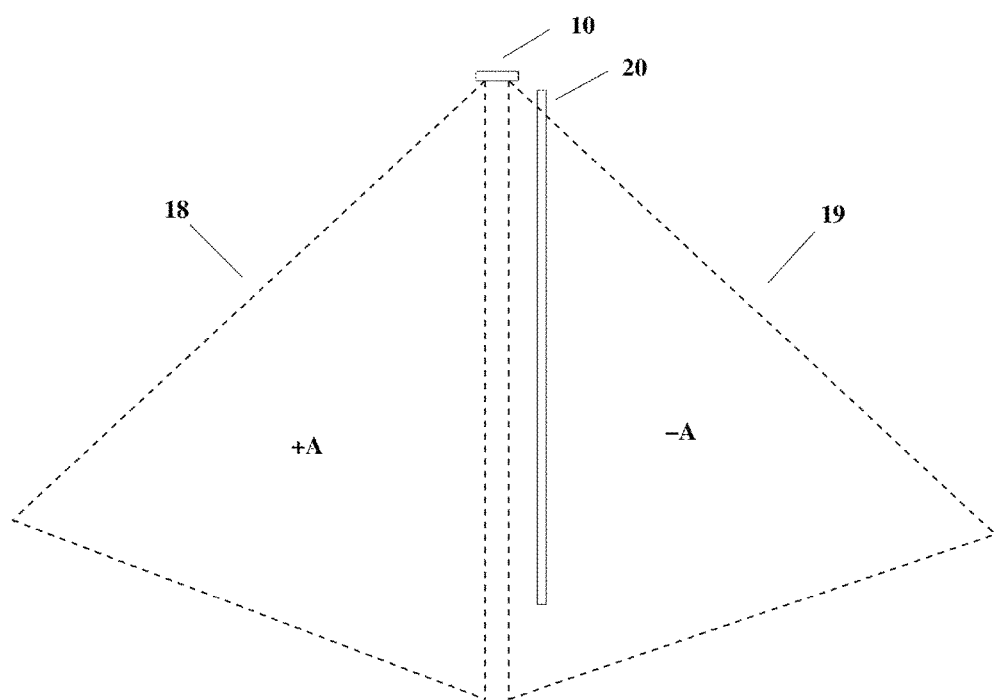
FIG. 2 illustrates a top view when the window is open.

FIG. 2 illustrates a top view of the device 10 monitoring a space where a window 20 is in an edge zone. The window 20 is open in FIG. 2. One FOV 19 of the device 10 covers the edge zone where the window 20 is located, while another FOV 18 of the device 10 covers an adjacent zone to the edge zone. The FOV 19 shown in FIG. 2 basically coincide with the edge zone, while the FOV 18 in FIG. 2 basically coincides with the adjacent zone to the edge zone. Besides, the FOV 18 in this embodiment is inside the structure, such as the house or building, that has the window 20.

As shown in FIG. 2, the device 10 produces a positive signal when an infrared source, such as a human being, enters the FOV 18, and produces a negative signal when an infrared source enters the FOV 19. It is apparent to those in the field that the FOV 18 and FOV 19 can be switched, as long as the inputs to the digital state machine 16 in FIG. 1 are adjusted accordingly.

FIG. 2 shows that the FOV 19 covers both the inside area and the outside area around the window 20. Also, FIG. 2 shows that there is a coverage gap between the FOV 18 and the FOV 19. Neither of these two FOV configurations in FIG. 2 is intended to be so limited. The FOV 19 may cover only the inside area around the window 20, and the FOV 18 and the FOV 19 may overlap at their edges. The FOV of an infrared detection element, such as a pyroelectric element, is generally defined by a lens. The configuration of an FOV for an infrared detection element is within the skills of one working in the field.

Figure 3:
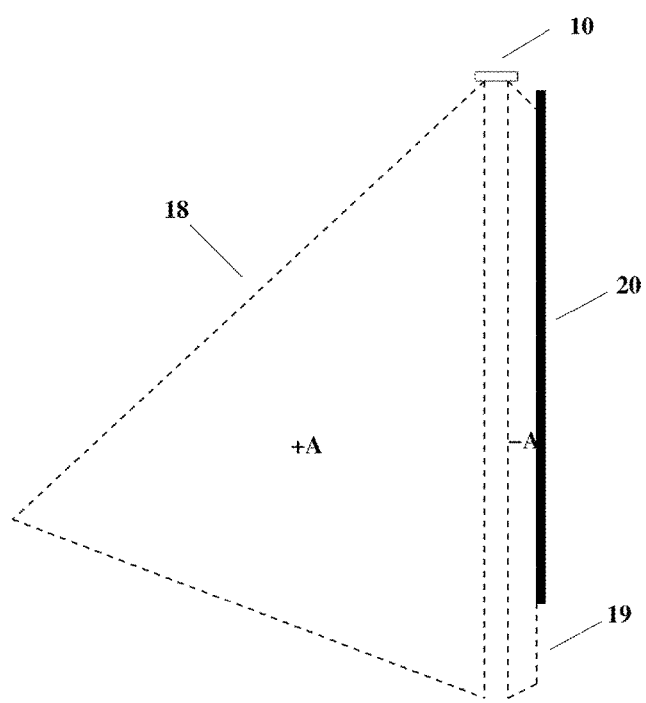
FIG. 3 illustrates a top view when the window is closed.

FIG. 3 illustrates a top view of the same settings as in FIG. 2, except that the window 20 is closed in FIG. 3. In general, the thermal infrared radiation of a human being or animal does not pass through the glass of a window. Therefore, the FOV 19 in FIG. 3 is reduced to cover the inside area around the window 20. But it is not intended to be so limited. Depending on the infrared spectrum detected by the device 10 and the glass used by the window 20, the FOV 19 in FIG. 3 may still cover the area outside the window 20 when the window is closed, if the FOV 19 is configured to do so.

Figure 4:
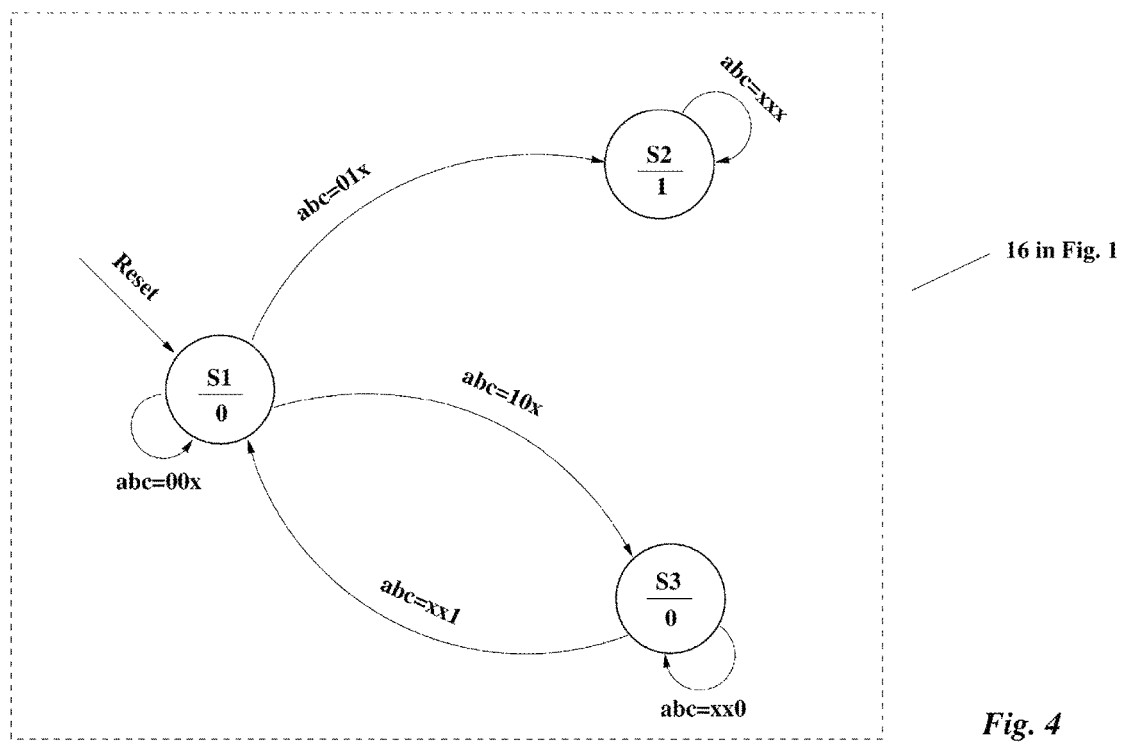
FIG. 4 shows a digital state machine for some embodiments of the system and method.

FIG. 4 shows the digital state machine 16 in FIG. 1. The digital state machine 16 has three states, which, just for convenience, are denoted as S1, S2, and S3, respectively. Each state is shown as a circle in FIG. 4. Inside the circle of each state, there is the state denotation, and below the state denotation is the output of the digital state machine in the state. The digital state machine 16 produces an alarm signal in state S2, as shown by the output of 1 in the circle of state S2. The digital state machine 16 does not produce an alarm signal in state S1 or state S3, as shown by the output of 0 in their circles.

Depending on its current inputs and state, the digital state machine 16 transits among the three states of S1, S2, and S3. As shown in FIG. 1 and described earlier, the inputs to the digital state machine 16 are the outputs of the comparators 12 and 13 and the timer 15, which, just for convenience, are denoted as "a", "b", and "c", respectively. Each state transition is shown as a directional arc from the current state to the next state. The inputs triggering a state transition are shown beside the transition arc of the state transition.

As shown in FIG. 4, the digital state machine 16 enters state S1, the original state, when it is reset. When the inputs "abc" become "01x", in which the "x" is either a logic 0 or 1, the digital state machine 16 in state S1 transits to state S2 and produces an alarm signal. Upon entering state S2, the digital state machine 16 stays in state S2 till the digital state machine is reset. On the other hand, when the inputs "abc" become "10x", the digital state machine 16 in state S1 transits to state S3. The digital state machine 16 in state S3 transits to state S1 when the inputs "abc" become "xx1". Otherwise, the digital state machine 16 in state S3 stays in state S3.

When an intruder opens or breaks the window 20 in FIG. 3, or approaches the window 20 in FIG. 2, the system and method in FIG. 1 produces an alarm signal. The intruder enters the FOV 19 when the intruder opens or breaks the window 20 in FIG. 3, or approaches the window 20 in FIG. 2. This entry event causes the device 10 to produce a negative signal. The negative signal reaches the comparator 13 in FIG. 1, and the comparator 13 produces a logic 1. This logic 1 is fed to the input "b" of the digital state machine 16 in FIG. 1. Upon receiving the logic 1 at the input "b", the digital state machine 16 transits from state S1 to state S2 and produces an alarm signal, as shown in FIG. 4. When an occupant is around the window 20, an intruder, in general, does not open or break the window. If an intruder does open or break the window in such a case, the occupant around the window will be alerted by the activities of the intruder.

When an occupant approaches the window 20 in FIG. 2 or FIG. 3 and moves around the window, such as operating the window or its curtain, the system in FIG. 1 does not produce an alarm signal. The occupant enters the FOV 18 first when the occupant approaches the window 20. The entry of the occupant into the FOV 18 causes the device 10 to generate a positive signal. The generated positive signal is amplified by the amplifier 11 in FIG. 1, and then fed to the comparators 12 and 13. Upon receiving the signal, the comparator 12 generates a logic 1 at its output. This logic 1 is fed to the input "a" of the digital state machine 16 in FIG. 1, and thus the digital state machine transits from state S1 to state S3, as shown in FIG. 4.

When the occupant reaches the window 20 and operates the window or its curtain, the occupant moves around the window, and thus enters the FOV 18 or the FOV 19 from time to time. These entry events cause the device 10 to generate a positive or negative signal repeatedly. These signals are converted to logic 1s by the comparators 12 or the comparator 13 in FIG. 1. These generated logic 1s are fed to the OR gate 14. The OR gate 14 thus outputs logic 1s to the reset input of the timer 15 in FIG. 1. When the timer 15 is reset by the logic 1s repeatedly, it does not expire. Since the timer 15 does not expire, the input "c" to the digital state machine 16 in FIG. 1 stays as a logic 0, and thus the digital state machine 16 stays in sate S3, as shown in FIG. 4.

However, after the occupant finishes operating the window or its curtain, and then leaves the monitored space, the timer 15 in FIG. 1 stops receiving logic 1s at its reset input. The timer, therefore, finally expires after a predetermined amount of time, such as several tens of seconds. The expiration of the timer 15 causes the input "c" to the digital state machine 16 in FIG. 1 to become a logic 1. The logic 1 at the input "c" causes the digital state machine 16 to transit from state S3 to state S1, which is the original state of the digital state machine, as shown in FIG. 4.

The digital state machine in FIG. 4 can be readily implemented in software or hardware. The digital state machine presents a detailed flowchart for software implementation. Logic gates and flip-flops can be used to implement the digital state machine in hardware, either manually or with a computer-aided design (CAD) tool. It is within the skills of a worker in the field to implement a digital state machine, such as the one in FIG. 4, in either hardware or software. Besides, the functions of the comparators 12 and 13, the OR gate 14, and the timer 15 in FIG. 1 can be implemented in software too, when the application of the disclosed system and method demands.

In addition, the digital state machine in FIG. 1 is not limited to the design in FIG. 4. First, the digital state machine in FIG. 4. can have small variations without affecting its main function. For example, the digital state machine in FIG. 4 may transit from state S2 to state S1 after it generates an alarm signal. After receiving an alarm signal, such as one from the link 17 in FIG. 1, a security circuit or system (not shown in FIG. 1), in general, does not stop generating alarms, such as sound and light, until the circuit or system is reset by an operator. Second, digital state machines of various designs may fulfill the same or similar logic function. Therefore, the digital state machine in FIG. 4 can be replaced by any digital state machine that fulfills the same or similar logic function as the one in FIG. 4.

Finally, a logic 1 is used in FIGS. 1-4 as the "effective" logic in the embodiment illustrating the disclosed system and method for intrusion detection. Particularly, a component in the embodiment responds to a logic-1 input, and also produces a logic-1 output when detecting a significant event. It is apparent to those in the field that when some insignificant modifications are done to the embodiment, a logic 0 can be used as the "effective" logic in the embodiment.

An intrusion detection embodiment of the disclosed system and method is described above. With a small configuration modification, FIGS. 1-4 can also be used to illustrate an escape detection embodiment of the disclosed system and method. In the escape detection embodiment, the FOV 18 in FIG. 2 and FIG. 3 is outside the structure that has the window 20, instead of inside the structure as in the earlier intrusion detection embodiment. In the escape detection embodiment, the system shown in FIG. 1 produces an alarm signal when an infrared source, such as a human being, breaks or opens the window 20 in FIG. 3 from inside, or approaches the window 20 in FIG. 2 from inside. But the system does not produce an alarm signal when there is normal activity outside the window 20, such as a guard patrolling outside the window.

In both embodiments described above, the digital state machine 16 in FIG. 1 produces an alarm signal when an intruder or an escaper enters the FOV 19 covering the edge zone in FIG. 2 or FIG. 3. In some other embodiments, the digital state machine 16 can be configured to produce an alarm signal when an intruder or escaper enters the FOV 18 after crossing the FOV 19. The digital state machine 16 shown in FIG. 5. is modified from the one in FIG. 4 to accommodate the new embodiments.

Figure 5:
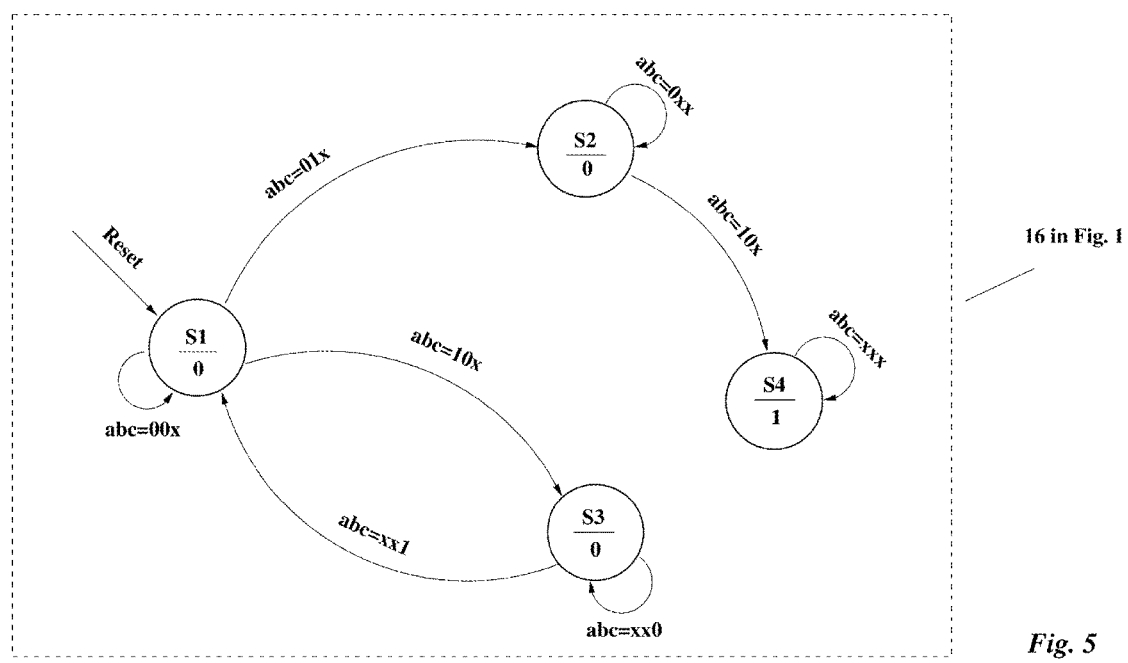
FIG. 5 shows another digital state machine for some other embodiments of the system and method.

As shown in FIG. 5, after an intruder or escaper enters the FOV 19 in FIG. 2 or FIG. 3, the digital state machine in the new embodiments transits from state S1 to state S2, but does not produce an alarm signal. The digital state machine stays in sate S2 until the intruder or escaper enters the FOV 18 in FIG. 2 or FIG. 3. The entry into the FOV 18 results in the input "a" of the digital state machine to become a logic 1. The logic 1 at the input "a" causes the digital state machine to transit from state S2 to state S4 and produce an alarm signal, as shown in FIG. 5. The digital state machine in state S4 stays in state S4 until it is reset.

Similar to the digital state machine in FIG. 4, the digital state machine in FIG. 5 can have small variations without affecting its main logic function. Moreover, the digital state machine in FIG. 5 can be replaced by any digital state machine that fulfills the same or similar logic function as the one in FIG. 5 does.

While the disclosed system and method has been described in terms of various embodiments thereof for invasion detection or escape detection, it is not intended to be so limited, but rather only to the extent set forth in the claims that follow.

What is claimed is:

1. An infrared detection system for security, said system comprising:
    an infrared detection device for monitoring a space using a plurality of fields of view, wherein some of said fields of view cover an edge zone of said space and the rest of said fields of view cover an adjacent zone to said edge zone;
    said infrared detection device producing a signal when one or more infrared sources, such as human beings, enter one of said fields of view, wherein said signal is unique for identifying said one of said fields of view; and
    a data processing means for processing signals from said infrared detection device and for producing an alarm signal when one or more infrared sources have entered one of said fields of view covering said edge zone and preceding this entry event no infrared source had entered any of said fields of view of said infrared detection device for a predetermined amount of time.

2. The system in claim 1, wherein said infrared detection device and said data processing means are in the same electronic enclosure.

3. The system in claim 1, wherein said infrared detection device and said data processing means are in a plurality of electronic enclosures and each of said enclosures encloses one or more components of said infrared detection device, said data processing means, or both.

4. The system in claim 1, wherein said predetermined amount of time is from several seconds to several hundreds of seconds.

5. The system in claim 1, wherein said data processing means has the option of being configured to produce an alarm signal when an infrared source enters any of said fields of view of said infrared detection device.

6. The system in claim 1, further including one or more circuits for generating alarms of sound, light, voice, telecommunications, or a combination of them.

7. The system in claim 6, further including one or more circuits for taking defense actions of locking doors, releasing defense materials, or doing both.

8. An infrared detection method for security, said method comprising:
    monitoring a space with an infrared detection means having a plurality of fields of view, wherein monitoring an edge zone of said space with some of said fields of view and monitoring an adjacent zone to said edge zone with the rest of said fields of view;
    producing a signal when one or more infrared sources, such as human beings, enter one of said fields of view, wherein said signal is unique for identifying said one of said fields of view; and
    processing the signals from said infrared detection means with a data processing means and producing an alarm signal when one or more infrared sources have entered one of said fields of view covering said edge zone and preceding this entry event no infrared source had entered any of said fields of view of said infrared detection means for a predetermined amount of time.

9. The method in claim 8, wherein said predetermined amount of time is from several seconds to several hundreds of seconds.

10. The method in claim 8, further including generating alarms of sound, light, voice, telecommunications, or a combination of them with a circuit means.

11. The method in claim 10, further including taking defense actions of locking doors, releasing defense materials, or doing both with a circuit means.

* * * * *